United States Patent Office 3,377,391
Patented Apr. 9, 1968

3,377,391
HIGH TEMPERATURE, SHORT-CONTACT-TIME PYROLYSIS OF CHLOROTRIFLUOROMETHANE
John Richard Soulen, Narberth, and William Ford Schwartz, King of Prussia, Pa., assignors to Pennsalt Cemicals Corporation, Philadelphia, Pa., a corporation of Pennsylvania
No Drawing. Filed Oct. 20, 1965, Ser. No. 499,084
6 Claims. (Cl. 260—653)

ABSTRACT OF THE DISCLOSURE

Chlorotrifluoromethane ($CClF_3$) is pyrolyzed at a temperature within the range of about 1200° C. to about 2000° C. for a period of from 0.0002 to 0.05 second to produce, as the major products, 1,2-dichlorotetrafluoroethane, carbon tetrafluoride, and dichlorodifluoromethane.

This invention relates to the preparation of other organic fluoro and fluorochloro compounds by the pyrolysis of chlorotrifluoromethane. More particularly, this invention concerns pyrolyzing chlorotrifluoromethane ($CClF_3$) to produce, as the major products, 1,2-dichlorotetrafluoroethane ($CClF_2CClF_2$), carbon tetrafluoride ($CF_4$), and dichlorodifluoromethane ($CCl_2F_2$). By "pyrolysis" is meant the trasformation of a compound into another compound or other compounds through the agency of heat alone, and therefore the term includes not only the rearrangement of a compound but also the making of more complex compounds.

A. B. Trenwith and R. H. Watson, J. Chem. Soc., 1957, pp. 2368–2372, describe the pyrolysis of $CClF_3$ at temperatures ranging from 700° to 850° C., whereby the principal products were $CO_2$ and chlorine, with a smaller amount of $CF_2Cl_2$ and a trace amount of $CF_4$ being produced. $CClF_2CClF_2$ was not found in the reaction products. N. V. Thornton, A. B. Burg and H. I. Schlesinger, JACS, 55 (1933), pp. 3177–3182, decomposed $CClF_3$ in a high tension electric discharge to produce $CF_4$ and smaller quantities of $CCl_2F_2$; however, no chlorofluoroethanes were produced by this electric discharge technique.

It has now been discovered that high temperature pyrolysis of $CClF_3$, i.e., in the range of about 1200° C. to about 2000° C., unexpectedly produces $CClF_2CClF_2$, $CF_4$ and $CCl_2F_2$ in relatively high yields as principal reaction products, and as minor products, $CF_2=CF_2$, $CCl_3F$ and $CCl_2FCClF_2$. However, the period of the pyrolysis reaction embodied herein is very short and should not exceed about 0.05 second.

The product $CF_4$ is useful as a dielectric fluid and as a component of aerosol and refrigerant compositions. The product $CClF_2CClF_2$ is a valuable refrigerant used mainly in systems having centrifugal rotary compressors. The product $CCl_2F_2$ also is a kell known refrigerant. The minor product $CF_2=CF_2$ is a starting material for preparing useful polymers. The minor product $CCl_3F$ also is a well-known refrigerant and, moreover, $CCl_2F_2$ and $CCl_3F$ each can be pyrolyzed at high temperatures to produce additional $CClF_2CClF_2$, as set forth in our copending applications, Ser. No. 497,535, filed Oct. 18, 1965 and Ser. No. 495,348, filed Oct. 12, 1965, respectively.

As stated above, the pyrolysis of $CClF_3$ is carried out according to this invention at a temperature within the range of about 1200° C. to about 2000° C. The preferred temperature range, with regard to obtaining the highest conversion of the $CClF_3$ and best yields of $CClF_2CClF_2$ and $CF_4$ therefrom, is from about 1450° C. to about 1850° C.

As earlier stated, in combination with the high pyrolysis temperatures employed in accordance with this invention, very short contact times of the $CClF_3$ at such temperatures are used, that is, contact times on the order of about 0.0002 to 0.05 second, preferably in the range of about 0.0006 to about 0.01 second. At contact times of the usual order of magnitude used in pyrolyses of this type, i.e., of the order of about 10 seconds and higher, the process of this invention is inoperative because of considerable degradation of the reactant and reaction products. As used herein, contact time is defined as follows:

contact time (seconds) =

$$\frac{\text{heated reactor volume}}{\text{volume of gas per second (calculated at reaction temperature and pressure) fed to reactor}}$$

The short contact times indicated above for the pyrolysis of this invention correspond to very high space velocities ranging from about 500 to about 120,000 per hour which permit a high rate of feed and reduce reactor volume needed. Space velocity is defined as volumes of reactant (measured at standard temperature and pressure (STP), i.e., 0° C. and 760 mm. Hg) per volume of heated reactor per hour. This is in sharp contrast to the much lower space velocities previously employed in the pyrolysis of $CClF_3$, on the order of about 9 per hour. For example, A. B. Trenwith and R. H. Watson, J. Chem. Soc., ibid., used the extended reaction times of about 100 to 115 seconds for pyrolyzing $CClF_3$ at 700° C. to 850° C.

The reaction pressure in the present process is not critical and may be atmospheric, subatmospheric, or superatomspheres. Superatomspheric pressure may range, e.g., up to about 10 atmospheres. However, atmospheric and subatmospheric pressure operation will generally be found most convenient. As a practical limit, pressures lower than about one mm. Hg abs. are not recommended. Preferred operating pressures will generally range from about 10 mm. Hg to atmospheric pressure.

The reaction is conveniently carried out by continuously passing a stream of the $CClF_3$ feed through an elongated tube preferably having a high ratio of wall area to cross-sectional area so that heat may be rapidly and continuously transferred from the heated reactor walls to the gaseous reactant. The reactor should be constructed of a material resistant to attack by the reactant and reaction products at the high operating temperatures. Materials of this type include for example, inert graphite, boron nitride, and like inert materials. The reactor can be heated to the desired pyrolysis temperatures in any suitable manner such as by electrical induction heating or by placing the reactor in an electrically heated furnace.

The products of the pyrolysis passing from the reactor are cooled and usually will be scrubbed in caustic solution or other alkaline solution to remove acidic inorganic by-products (e.g., chlorine and fluorine). The organic products are separated from the reaction mixture in a conventional manner by fractional distillation. The unreacted $CClF_3$ can, of course, be recovered for recycling purposes.

EXAMPLES 1–5

In the experiments herein described, specific embodiments of the invention are set forth to illustrate and clarify the invention.

Gaseous $CClF_3$ is passed continuously at a measured rate through a 1/8" I.D. x 1/2" O.D. x 13" long, inert graphite tube reactor centered within a 2" diameter "Vycor" high-silica glass tube, 15" long. The reactor is inductively heated with a 3 1/4" long load coil of 12 turns of ¼" copper tubing about the "Vycor" tube, the power for said coil supplied by a high frequency generator with a maximum output of 7.5 kilowatts operating at 450 kilocycles. The effective reaction zone in the tube is thus 3¼ inches. The temperature of the reactor is measured with an optical pyrometer focused on the center of the heated portion of the tube. Examination of the inert graphite reactor after repeated runs therein reveals that its inner surface is unaffected by the passage of the hot gases therethrough.

The product mixture passes from the reactor and is condensed in a trap cooled with liquid nitrogen. The condenser is vented to a mechanical vacuum pump which maintains the subatmospheric reaction pressure employed in these examples. After completion of the run, the reaction products are warmed to room temperature and transferred to an evacuated stainless steel cylinder. The reaction products are then passed through a series of scrubbers containing aqueous solutions of sodium hydroxide to remove inorganic by-products. The organic reaction products are analyzed using gas-liquid chromatographic and infrared analyses techniques.

The data from five runs are summarized in Table I. In addition to the components listed in the "Product" column of Table I, the reaction products contain unreacted $CClF_3$ and varying minor amounts of $CF_3CF_3$, and $CCl_4$.

EXAMPLE 6

The procedure of the preceding examples is repeated using an 80% platinum-20% rhodium alloy tube as the pyrolysis reactor. The pyrolysis temperature is about 1500° C., the pressure is 25 mm. Hg and the contact time is 0.002 second (space velocity=9390 per hour). 59% of the $CClF_3$ fed is converted via the pyrolysis reaction. The principal reaction products are $CF_4$ (70 weight percent), $CClF_2CClF_2$ (6%) and $CCl_2F_2$ (24%).

It is to be understood that the foregoing illustrative examples should not be construed as limitative of the scope of the invention which is defined by the appended claims.

TABLE I

| Example | Pyrolysis Conditions ||||Percent Conversion of $CClF_3$ | Weight percent in recovered converted product of — ||||||
|---|---|---|---|---|---|---|---|---|---|---|---|
| | Feed Rate of $CClF_3$, gms./min. | Pressure mm. Hg, Abs. | Temp., °C. | Contact Time, seconds | | $CClF_2CClF_2$ | $CF_4$ | $CCl_2F_2$ | $CF_2=CF_2$ | $CCl_3F$ | $CCl_2FCClF_2$ |
| 1 | 0.449 | 31 | 1,450 | 0.0024 | 21.8 | 18.8 | 46.3 | 21.8 | 10.2 | Nil | Trace |
| 2 | 0.465 | 35 | 12610 | 0.0024 | 66.2 | 14.5 | 56.2 | 18.3 | 7.5 | 0.7 | 0.9 |
| 3 | 0.352 | 38 | 1,705 | 0.0033 | 77.9 | 18.4 | 49.2 | 25.3 | 2.7 | 1.9 | 0.9 |
| 4 | 0.204 | 44 | 12790 | 0.0050 | 81.3 | 17.4 | 30.1 | 38.7 | 4.4 | 1.9 | 2.4 |
| 5 | 0.147 | 21 | 12350 | 0.0041 | 85.0 | 28.4 | 34.0 | 21.2 | 2.3 | 5.9 | 0.3 |

We claim:
1. The method which comprises pyrolyzing chlorotrifluoromethane at a temperature of from about 1200° C. to about 2000° C. wherein the pyrolysis time is from about 0.0002 to about 0.05 second, a major product of the pyrolysis being 1,2-dichlorotetrafluoroethane.
2. The method of claim 1 wherein the pyrolysis temperature is from about 1450° C. to about 1850° C.
3. The method of claim 1 wherein the pyrolysis time is from about 0.0006 to about 0.01 second.
4. The method which comprises pyrolyzing chlorotrifluoromethane at a temperature of from about 1450° C. to about 1850° C. wherein the pyrolysis time is from about 0.0006 to 0.01 second, a major product of the pyrolysis being 1,2-dichlorotetrafluoroethane.
5. The method of pyrolyzing chlorotrifluoromethane which comprises passing chlorotrifluoromethane through a tube heated to a temperature of from about 1200° C. to about 2000° C., wherein the contact time is within the range of about 0.0002 to 0.05 second, a major product of the pyrolysis being 1,2-dichlorotetrafluoroethane.
6. The method of pyrolyzing chlorotrifluoromethane which comprises passing chlorotrifluoromethane through a tube heated to a temperature of from about 1450° C. to about 1850° C., wherein the contact time is within the range of about 0.0006 to about 0.01 second, a major product of the pyrolysis being 1,2-dichlorotetrafluoroethane.

References Cited
UNITED STATES PATENTS 3,009,966   11/1961   Hauptschein et al.   260—653.3
3,188,356   6/1965   Hauptschein et al.   260—653.5

FOREIGN PATENTS 1,357,773   3/1964   France.

DANIEL D. HORWITZ, *Primary Examiner.*

UNITED STATES PATENT OFFICE
CERTIFICATE OF CORRECTION

Patent No. 3,377,391                                          April 9, 1968

John Richard Soulen et al.

It is hereby certified that error appears in the above numbered patent requiring correction and that the said Letters Patent should read as corrected below.

Column 1, line 57, "kell" should read -- well --.
Column 2, line 34, "superatmospheres" should read -- super-atomospheric --. Columns 3 and 4, TABLE I, second column, line 1 thereof, "0.449" should read -- 0.448 --; same TABLE, fourth column, lines 1, 2, 3, 4 and 5 thereof,

|  |  |  |
|---|---|---|
| 1,450 |  | 1,450 |
| 12610 |  | 1,610 |
| 1,705 | should read | 1,705 |
| 12790 |  | 1,790 |
| 12850 |  | 1,850 | same TABLE I, ninth column, line 2 thereof, "18.3" should read -- 18.4 --.

Signed and sealed this 2nd day of September 1969.

(SEAL)
Attest:

EDWARD M. FLETCHER, JR.                       WILLIAM E. SCHUYLER, JR.
Attesting Officer                                    Commissioner of Patents